(12) United States Patent
Lim

(10) Patent No.: US 8,248,444 B2
(45) Date of Patent: Aug. 21, 2012

(54) LIGHT SCANNER INCLUDING LENS ASSEMBLING DATUMS

(75) Inventor: Heon-Hee Lim, Suwon-si (KR)

(73) Assignee: SSamsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 12/580,772

(22) Filed: Oct. 16, 2009

(65) Prior Publication Data
US 2010/0309281 A1 Dec. 9, 2010

(30) Foreign Application Priority Data
Jun. 3, 2009 (KR) .................. 10-2009-0049096

(51) Int. Cl.
*G02B 7/00* (2006.01)
*G02B 7/02* (2006.01)

(52) U.S. Cl. ........................................ 347/242; 347/257
(58) Field of Classification Search .................. 347/241, 347/242, 256, 257
See application file for complete search history.

(56) References Cited

U.S. PATENT DOCUMENTS
7,528,856 B2 * 5/2009 Kato et al. .................... 347/242
* cited by examiner

*Primary Examiner* — Huan Tran
(74) *Attorney, Agent, or Firm* — Stanzione & Kim, LLP

(57) ABSTRACT

Disclosed is a light scanner with improved assembling datums of optical components. In the light scanner, an assembling datum with respect to a support body of an optical component is positioned between two ends of the optical component, for example, adjacent the central portion of the optical component. Accordingly, even when the lens is displaced, the change in an optical path may be reduced to mitigate the degradation in the image quality.

16 Claims, 11 Drawing Sheets

LIGHT SCANNER INCLUDING LENS ASSEMBLING DATUMS

CROSS-REFERENCE TO RELATED PATENT APPLICATION

This application claims the benefit of Korean Patent Application No. 10-2009-0049096, filed on Jun. 3, 2009, in the Korean Intellectual Property Office, the disclosure of which is incorporated herein by reference in its entirety.

TECHNICAL FIELD

The present disclosure generally relates to a light scanner used in an electrophotographic image forming apparatus, and, more particularly, to a light scanner with improved lens assembling datums.

BACKGROUND OF RELATED ART

An electrophotographic image forming apparatus, such as, for example, a laser printer, a fax machine, or a photocopier, uses a light scanner to form an electrostatic latent image, coats the electrostatic latent image with a developing agent to develop the latent image into a visible image of one or more colors, and prints the same on an information transfer medium. That is, when light is scanned from a light scanner onto a surface of a photosensitive body pre-charged to a predetermined potential, the potential of a portion of the photosensitive body that is exposed to the light is changes so that an electrostatic latent image embodying the resulting potential difference may be formed on the photosensitive body. When toner particles move to the electrostatic latent image by electrical force, the latent image is developed into a visible image on the photosensitive body.

A light scanner typically includes a light source and a plurality of lenses that are disposed on the light path to the photosensitive body to variously refract or focus the light. Such lenses need to be assembled into their respective positions with accuracy in order to form an electrostatic latent image precisely on the photosensitive body. Such precision or imprecision may in turn affect the quality of the developed image.

Accordingly, to improve the image quality, the positional error in assembling the lenses may need to be minimized. The positional deviations may be amplified or exacerbated during use in an image forming apparatus whose internal temperature may fluctuate widely, for example, typically anywhere between 20° C. and 60° C. Thus, proper assembling of these lenses may be considered as an important factor in attempting to increase the image quality.

SUMMARY OF DISCLOSURE

According to an aspect of the present disclosure, there is provided a light scanner for scanning light along a main scanning direction across a photosensitive body. The light scanner may include a source of light, a lens and a support body. The lens may be disposed on an optical path between the source of light and the photosensitive body. The support body may have a surface in supporting contact with the lens. A positional datum of the lens for assembling the lens with the support body may be located between two end portions of the lens.

The positional datum may be a first assembling datum for positioning the lens with respect to the support body in a sub-scanning direction. The sub-scanning direction may be substantially perpendicular to the main scanning direction, and may correspond to a direction of movement of the photosensitive body.

The lens may comprise at least one of a second assembling datum for positioning the lens in the main scanning direction and a third assembling datum for positioning the lens in an optical axis direction.

The positional datum may, for example, be located at the center portion of the lens.

The source of light may comprise a first source of light and a second source of light. The positional datum may be located between a first portion of the lens through which light from the first source of light passes and a second portion of the lens through which light from the second source of light passes.

The positional datum may be located between the center portion of the lens and an end portion of the lens.

The support body may comprise a frame having a groove into which the positional datum is received. The groove may have a surface in contact with the positional datum.

The support body may alternatively comprise a holder having a groove into which the positional datum is received. The groove may have a surface in contact with the positional datum. The holder may be coupled to a frame of the light scanner.

The lens may be a cylindrical lens.

According to another aspect of the present disclosure, an apparatus for scanning light from a light source along a main scanning direction across a photosensitive body may be provided to comprise a lens and a support body. The lens may be disposed in an optical path between the light source and the photosensitive body, and may have a contact surface located between two ends of the lens. The direction normal to the contact surface may be non-parallel to the optical axis of the lens. The support body may have a support surface opposingly facing, and in supporting contact with, the contact surface of the lens.

The contact surface of the lens may extend from substantially about a center portion of the lens.

The contact surface may be a first assembling datum for positioning the lens with respect to the support body in a sub-scanning direction. The sub-scanning direction may be substantially perpendicular to both the main scanning direction and the optical axis of the lens.

The lens may further comprise at least one of a second assembling datum for positioning the lens in the main scanning direction and a third assembling datum for positioning the lens in the optical axis direction.

The apparatus may further comprise a light deflector that may be arranged in the optical path and that may have a reflective surface moveably arranged so as to reflect light received from the light source along the main scanning direction. The cylindrical lens may be positioned along the optical path between the light source and the light deflector.

The support body may comprise a groove into which the lens is received. The supporting surface of the support body may be formed in the groove.

According to another aspect of the present disclosure, an image forming apparatus may be provided to include a light source configured to produce light, a photosensitive surface, an optical element and a support body. The photosensitive surface may be capable of changing an electrical potential level thereof in response to the light produced by the light source being incident thereupon. The optical element may be disposed in an optical path between the light source and the photosensitive surface, and may have a contact surface located between two ends thereof. The support body may have a support surface opposingly facing, and in supporting contact with, the contact surface of the optical element. The contact surface of the optical element may be a positional datum of the optical element for positioning the optical element in relation to the support body.

BRIEF DESCRIPTION OF THE DRAWINGS

Various aspects and advantages of the present disclosure will become apparent and more readily appreciated from the following description of several embodiments thereof, taken in conjunction with the accompanying drawings, in which.

DETAILED DESCRIPTION OF SEVERAL EMBODIMENTS

Figure 1:
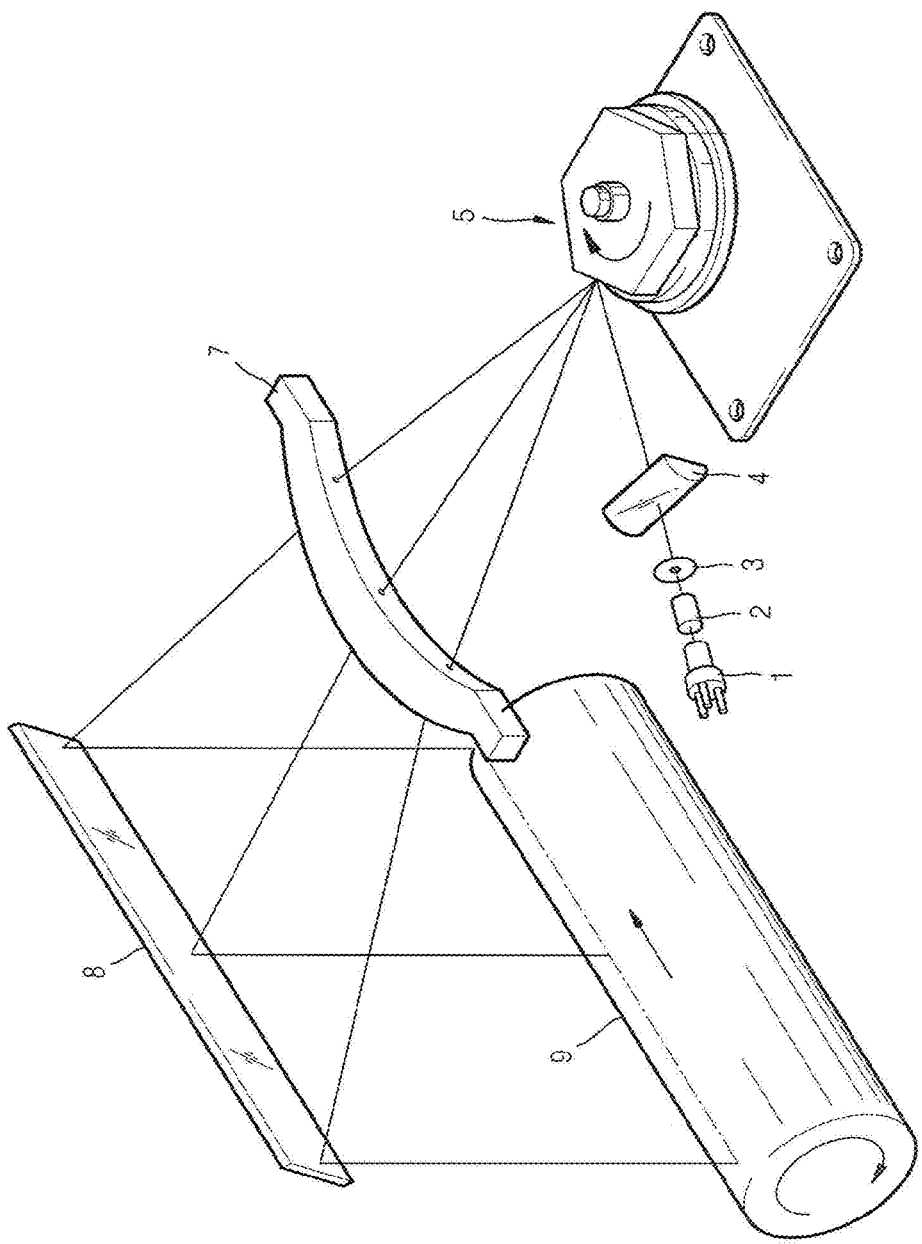
FIG. 1 is a schematic view of an inner structure of a light scanner including a single light source according to an embodiment of the present disclosure.

Reference will now be made in detail to several embodiments, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

FIG. 1 is a schematic illustration of an inner structure of a light scanner capable of forming an electrostatic latent image on a photosensitive body. Referring to FIG. 1, the light emitted from a light source 1 may sequentially pass through a collimator lens 2, a slit 3 and a cylindrical lens 4 prior to becoming incident upon a rotational polygonal mirror 5. The light that is reflected by the rotational polygonal mirror 5 may pass through an f-θ lens 7, and may subsequently be reflected from a mirror 8 to be incident on the surface of the photosensitive body 9. With such configuration shown in FIG. 1, by selectively turning on or off the light source 1, an electrostatic latent image may be formed based on the resulting potential differences between the exposed portions and the non-exposed portions of the photosensitive body 9.

Figure 2:
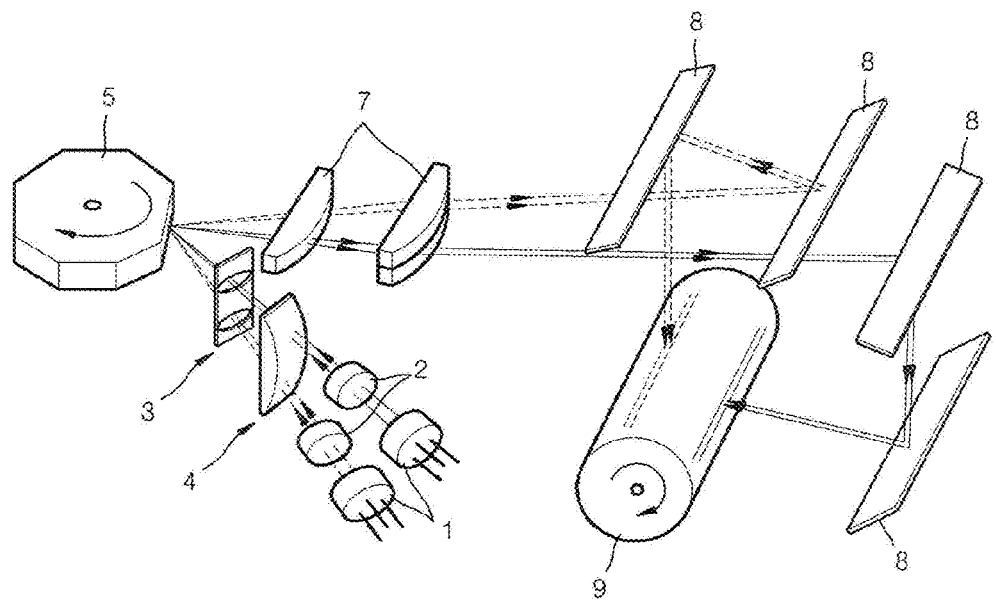
FIG. 2 is a schematic view of an inner structure of a light scanner including two light sources according to an embodiment of the present disclosure.

FIG. 2 is a schematic view of an inner structure of another example of a light scanner that includes two light sources 1 according to another embodiment of the present disclosure. Like reference numerals in FIG. 2 denote like elements of FIG. 1. According to an embodiment, two beams of light may pass through a lens such as the cylindrical lens 4 or the f-θ lens 7. Generally, the two beams may pass respectively through points of the lens that are symmetrical about the center of such lens.

Figure 3A:
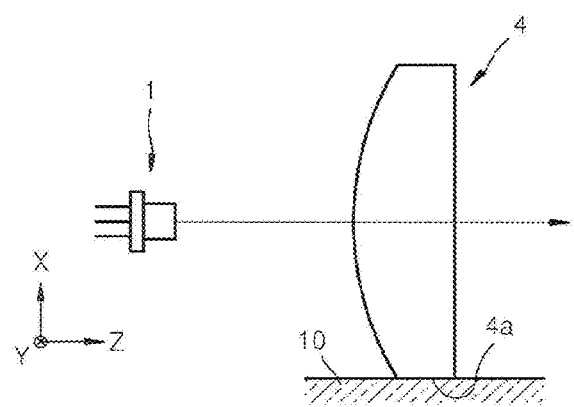
FIG. 3A is a schematic view illustrating a passage of light through the center of the cylindrical lens.
Figure 3B:
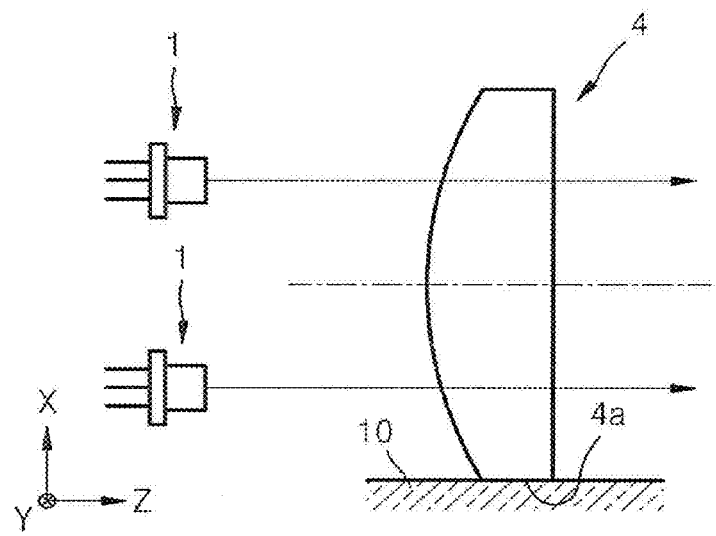
FIG. 3B is a schematic view illustrating passages of light that are symmetric about the cylindrical lens.

For example, when one light source 1 is used, and the cylindrical lens 4 may be assembled with the intent that the light is allowed to pass through substantially the exact center of the cylindrical lens 4 as illustrated in FIG. 3A in order for the light scanner to function optimally. When, on the other hand, two light sources 1 are used; the cylindrical lens 4 is assembled such that two light beams are intended to pass symmetrically about the center of the cylindrical lens 4 as illustrated in FIG. 3B. In FIGS. 3A and 3B, the Z direction, which is the light propagating direction, may also be referred to as an optical axis direction. The Y direction, which corresponds to the direction of the width of the photosensitive body 9, may also be referred to as a main scanning direction. The X direction, which corresponds to the proceeding direction of the photosensitive body 9, or the direction perpendicular to the Y direction, may also be referred to as a sub-scanning direction.

Figure 4A:
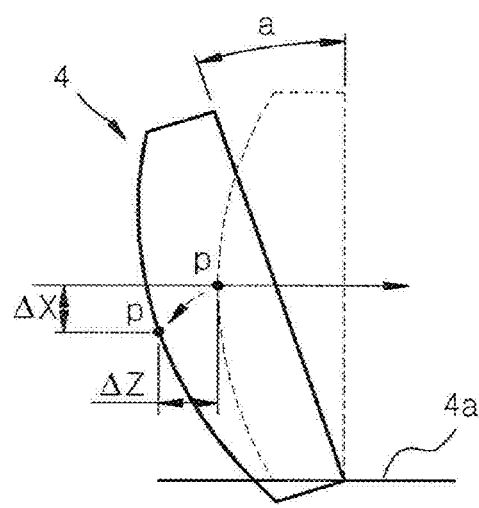
FIGS. 4A and 4B are schematic views illustrating the cylindrical lens at a rotated position where the lower end portion of the cylindrical lens is used as an assembling datum.
Figure 4B:
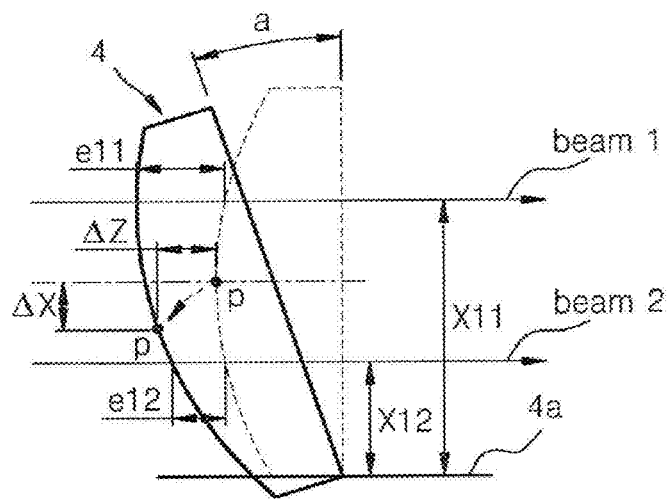

The position of a lens may drift because of, for example, an error during the assembly or thermal expansion that may occur during use. The effect of the drift of the lens may vary greatly according to the position of the assembling datum of the lens. An assembling datum may refer to a surface that serves as a datum for fixing the position of a lens for installation of the lens on an appropriate supporting body of a light scanner. That is, when a lower end portion of the cylindrical lens 4 serves an assembling datum 4a as shown in FIGS. 4A and 4B, the assembling datum 4a may first be attached to a supporting body 10 to set its position. The cylindrical lens 4 may then be fixed to the supporting body 10 by, for example, attaching an elastic piece to the rest of the cylindrical lens 4. FIGS. 4A and 4B are schematic views illustrating the cylindrical lens 4 at a rotated position. FIGS. 4A and 4B also show a lower cross-sectional portion of the cylindrical lens 4 as the assembling datum 4a.

The assembling datum 4a is a datum that is fixed so as to prevent the cylindrical lens 4 from moving in the sub-scanning direction (i.e., the X direction), and may thus be referred to as an assembling datum in the sub-scanning direction. A positional error of the cylindrical lens 4 may be caused by the assembling datum in the sub-scanning direction. This is because when the lower cross-section of the lens 4 is set as the assembling datum 4a in the sub-scanning direction, the degree of shifting of the path of light may increase when the position changes due to the rotation of the cylindrical lens 4.

For example, when a single light source 1 is used as shown in FIG. 4A, the cylindrical lens 4 may be intended to be positioned as indicated by the dotted line, at which position, an inflection point "p" of the cylindrical lens 4 may also be at the correct desired position. However, if the cylindrical lens 4 rotates by an angle "a" as denoted by the solid line, the inflection point "p" changes its position, and may be moved from the intended position by a distance ΔX in the sub-scanning direction and by a distance ΔZ along the light propagating direction. When this occurs, the light emitted from the light source 1 does not pass through the center of the cylindrical lens 4, and may be focused on the photosensitive body 9 incorrectly, which may thereby result in an increase in the resulting beam spot diameter, and which thus may degrade the image quality.

As another illustrative example, in the case of when two light sources 1 are used as shown in FIG. 4B, when the cylindrical lens 4 rotates by an angle "a" from its intended position (indicated by the dotted line) as illustrated by the solid line, the inflection point "p" moves from its intended position by a distance ΔX in the sub-scanning direction and by a distance ΔZ along the light propagating direction, resulting in the light emitted from the two light sources 1 not passing through the desired points of the cylindrical lens 4. When this occurs, the focus of light on the photosensitive body 9 may be incorrect, and thus an increase in the light beam spot diameter and degradation in the image quality may result. In this case, the light that passes through the cylindrical lens 4 away from the assembling datum 4a may be more problematic. That is, in the case of the beam 2 that passes nearer to the assembling datum 4a, the amount of the shift in the position (e12) on the cylindrical lens 4 is about a ×X12. However, in the case of the beam 1 that passes through the cylindrical lens 4 at a point further away from the assembling datum 4a, the amount of shift in position (e11) may be a ×X11, which is larger than e12. Since the assembling datum 4a is the rotational center of the cylindrical lens 4 around which the cylindrical lens 4 rotates, the amount of positional shift increases as light passes through the cylindrical lens 4 further away from the rotational center.

Figure 5:
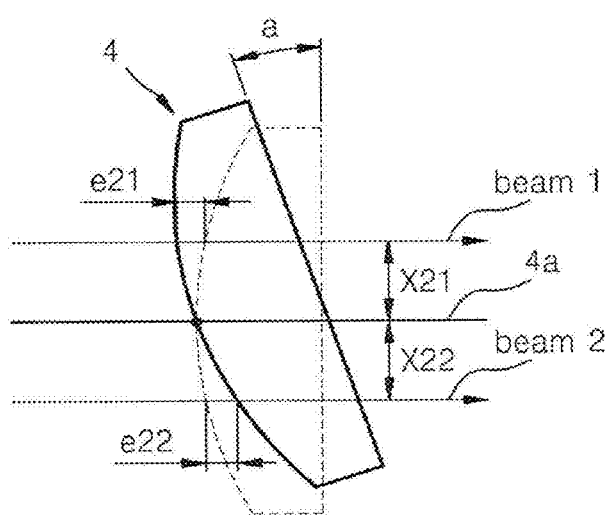
FIG. 5 is a schematic view illustrating the cylindrical lens at a distorted position when a center portion of the lens is used an assembling datum.

Thus, in accordance with an embodiment of the present disclosure, in order to minimize the positional shifting amounts, an assembling datum is set to be near the central portion of the inner portion of the cylindrical lens 4 between the upper and lower end portions of the cylindrical lens 4, instead of setting either the upper end portion or the lower end portion of the cylindrical lens 4 as the assembling datum. That is, referring to FIG. 5, when the assembling datum 4a is positioned at the center portion of the cylindrical lens 4, and when the cylindrical lens 4 rotates by an angle "a" as described above, the inflection point "p" stays at the same position, and the respective shifting amounts e21 and e22 of the beams 1 and 2 may be reduced when compared to the shifting amounts of the embodiment of FIG. 4B. When the cylindrical lens 4 rotates, the distances X21 and X22 from the assembling datum 4a, which is the rotation center, to points where light passes through the cylindrical lens 4 are shortened, and thus the shifting amounts are also reduced. Moreover, when a single light source is used, there may hardly be a change in the optical path because the inflection point "p" stays at the same position.

Hereinafter, several embodiments in which the sub-scanning direction assembling datum of the cylindrical lens 4 is set around a center portion of the cylindrical lens 4 between two end portions of the cylindrical lens 4 will be described.

Figure 6A:
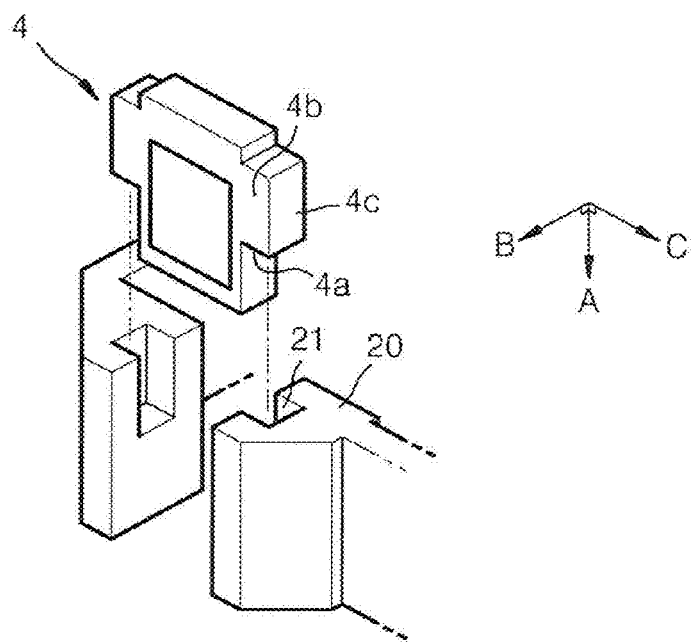
FIGS. 6A and 6B are schematic views illustrating a lens assembly structure of a light scanner according to an embodiment of the present disclosure.
Figure 6B:
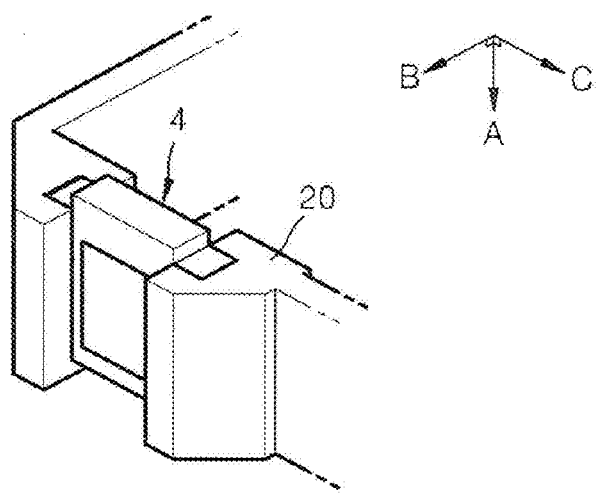

According to an embodiment, as illustrated in FIGS. 6A and 6B, there may be provided three assembling datums, that is, a sub-scanning direction assembling datum 4a, a main scanning direction assembling datum 4c and an optical axis direction assembling datum 4b. The sub-scanning direction assembling datum 4a is positioned near the center portion of the cylindrical lens 4. The cylindrical lens 4 may be installed to a frame 20 that includes an accommodation groove 21, which has surfaces to which the sub-scanning direction, the optical axis direction and the main scanning direction assembling datum 4a, 4b and 4c of the cylindrical lens 4 may be, respectively, attached. Accordingly, the cylindrical lens 4 may be inserted into the accommodation groove 21, and may be attached the surfaces so as to be fixed in position with respect to the directions A, B, and C. The width of the accommodation groove 21 in the optical axis direction (direction B) according to an embodiment may be equal to or slightly smaller than the width of the cylindrical lens 4 in the optical axis direction so that the cylindrical lens 4 may be received into the frame 20 in a tight fitting manner. Such tight fitting may allow some clearance in the directions A and C within which the cylindrical lens 4 may otherwise have a slight movement in those directions. That is, by inserting the cylindrical lens 4 while pulling the sub-scanning direction assembling datum 4a and the main scanning direction assembling datum 4c close to, so as to thereby attached to, their corresponding surfaces of the accommodation groove 21, the cylindrical lens 4 may be fixed in position by the tight fit in the optical axis direction. Accordingly, the sub-scanning direction, the optical axis direction and the main scanning direction assembling datums 4a, 4b and 4c may be attached to their respective corresponding surfaces on the accommodation groove 21, thereby fixing in position the cylindrical lens 4. According to an aspect of the present disclosure, the positioning of the sub-scanning direction assembling datum 4a near the center portion of the cylindrical lens 4 may allow the amount of positional shifting to be minimized notwithstanding an assembling error or a thermal expansion error, as previously described with reference to FIG. 5.

Figure 7A:
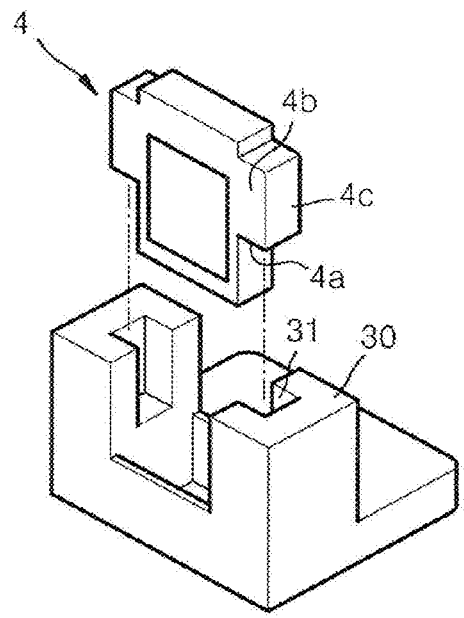
FIGS. 7A and 7B are schematic views illustrating a lens assembly structure of a light scanner according to another embodiment of the present disclosure.
Figure 7B:
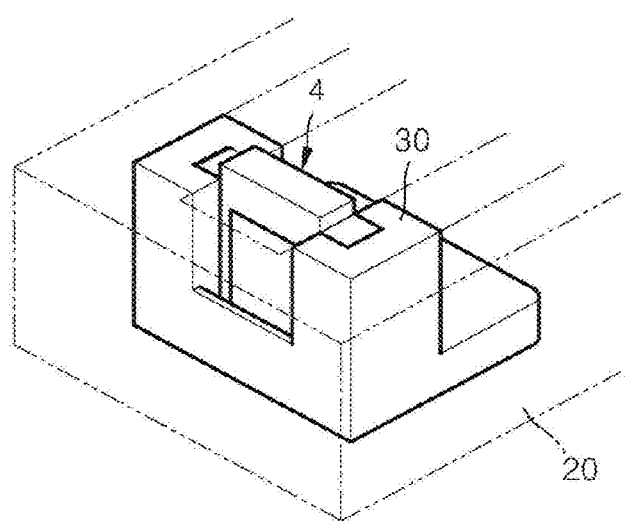

FIGS. 7A and 7B are schematic views illustrating a lens assembly structure of a light scanner according to another embodiment of the present disclosure.

Referring to FIGS. 7A and 7B, a holder 30 having an accommodation groove 31 is prepared, and a cylindrical lens 4 is first coupled to the holder 30, and then the holder 30 is coupled to a frame 20. Here, the holder 30 may be used as a medium to insert and closely attach sub-scanning direction, optical axis direction and main scanning direction assembling datums 4a, 4b and 4c to the accommodation groove 31. The coupling structure of the sub-scanning direction, optical axis direction and main scanning direction assembling datums 4a, 4b and 4c and the accommodation groove 31 of the current embodiment may be substantially the same as those in the embodiment of FIGS. 6A and 6B.

Figure 8A:
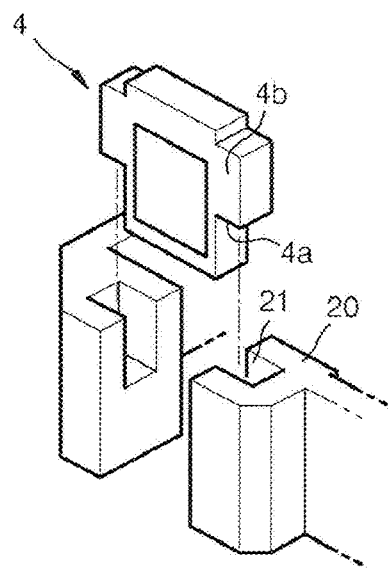
FIGS. 8A and 8B are schematic views illustrating a lens assembly structure of a light scanner according to another embodiment of the present disclosure.
Figure 8B:
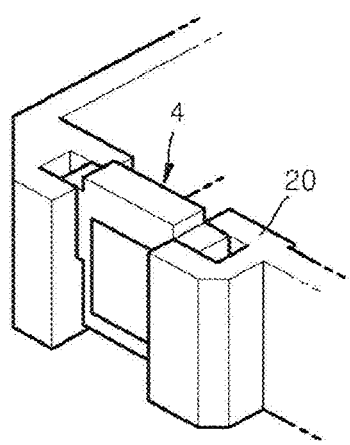

FIGS. 8A and 8B are schematic views illustrating a lens assembly structure of a light scanner according to another embodiment of the present disclosure.

Referring to FIGS. 8A and 8B, an assembling datum in the main scanning direction may not be present but only a sub-scanning direction assembling datum 4a and an optical axis direction assembling datum 4b are formed. That is, in the current embodiment, an assembling datum does not have to be set exactly in the main scanning direction. Also, the lens assembly structure of the current embodiment may be substantially the same as that of the embodiment of FIGS. 6A and 6B except that the cylindrical lens 4 need not be in contact with a corresponding surface of an accommodation groove 21 in the main scanning direction.

Figure 9A:
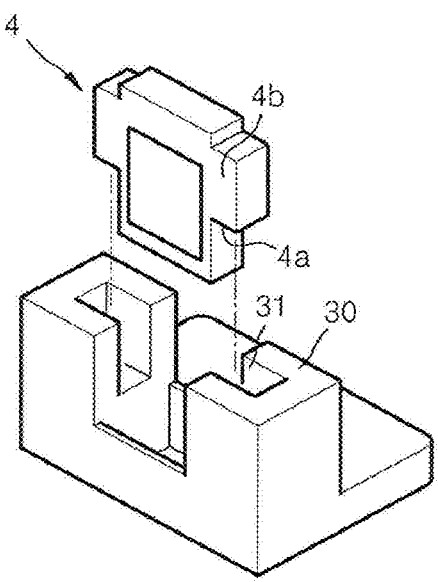
FIGS. 9A and 9B are schematic views illustrating a lens assembly structure of a light scanner according to another embodiment of the present disclosure.
Figure 9B:
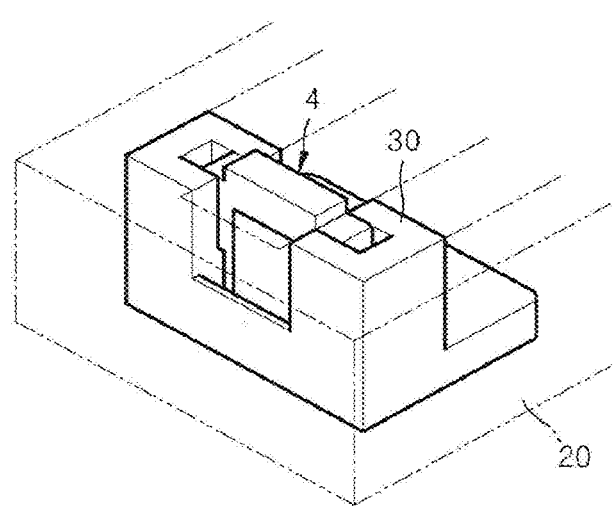

FIGS. 9A and 9B are schematic views illustrating a lens assembly structure of a light scanner according to another embodiment of the present disclosure. Referring to FIGS. 9A and 9B, the cylindrical lens 4 of FIGS. 8A and 8B may be coupled to a frame 20 through a holder 30 used as a medium.

Figure 10A:
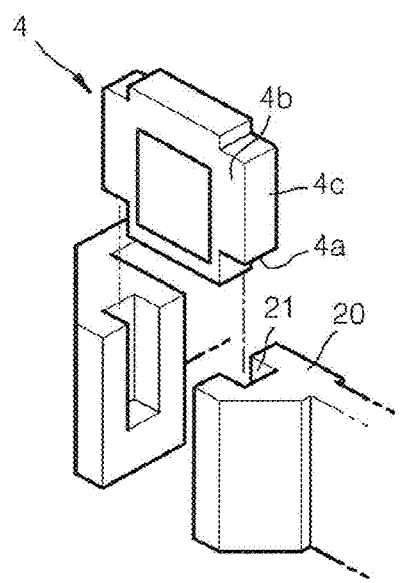
FIGS. 10A and 10B are schematic views illustrating a lens assembly structure of a light scanner according to another embodiment of the present disclosure.
Figure 10B:
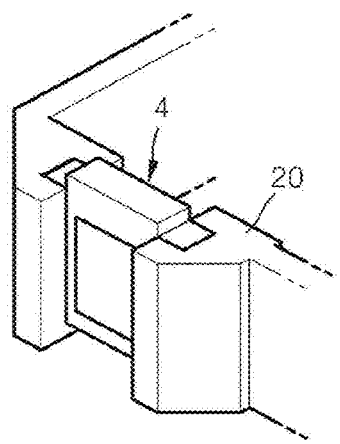

FIGS. 10A and 10B are schematic views illustrating a lens assembly structure of a light scanner according to another embodiment of the present disclosure. Referring to FIGS. 10A and 10B, a sub-scanning direction assembling datum 4a is positioned between a center portion and an end portion of a cylindrical lens 4. In this case, the positional shifting amount may still be reduced when compared to a sub-scanning direction assembling datum 4a positioned at end portions of the cylindrical lens 4 as illustrated in the embodiment of FIGS. 4A and 4B.

Figure 11A:
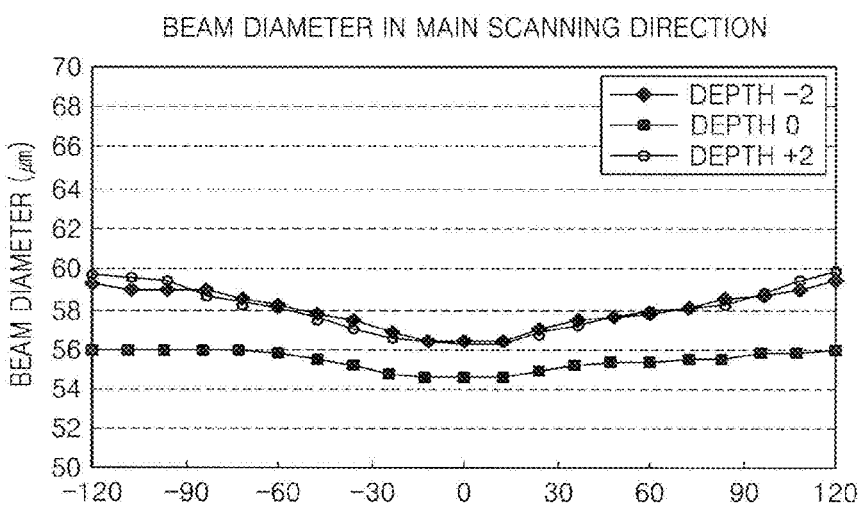
FIGS. 11A and 11B are simulation results of a beam diameter of light when an end portion of a lens is used an assembling datum.
Figure 11B:
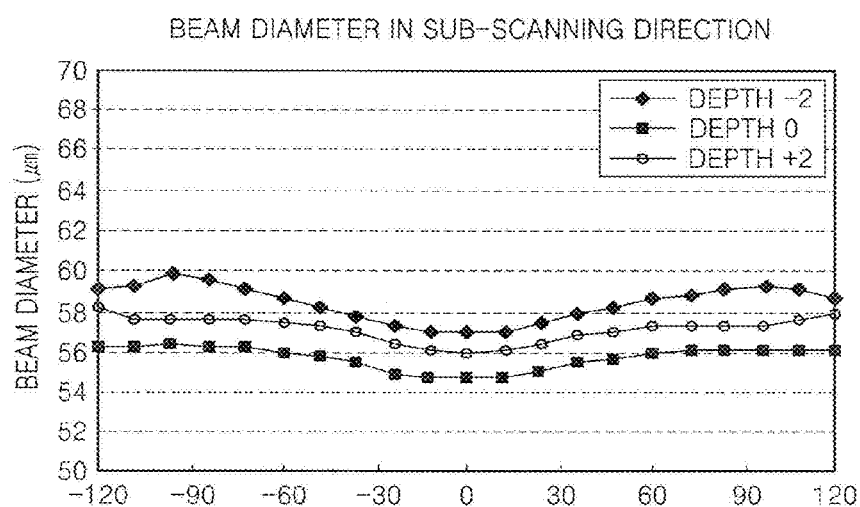
Figure 12A:
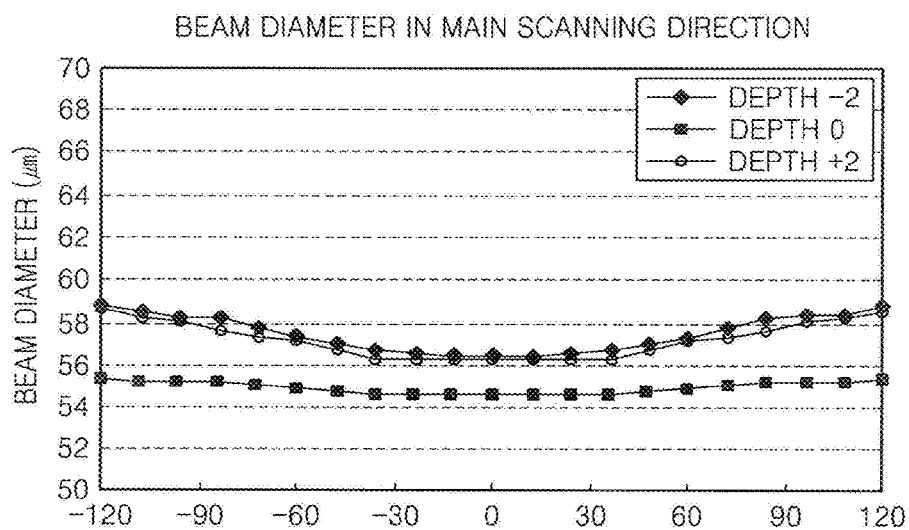
FIGS. 12A and 12B are simulation results of a beam diameter when a center portion of a lens is used an assembling datum.
Figure 12B:
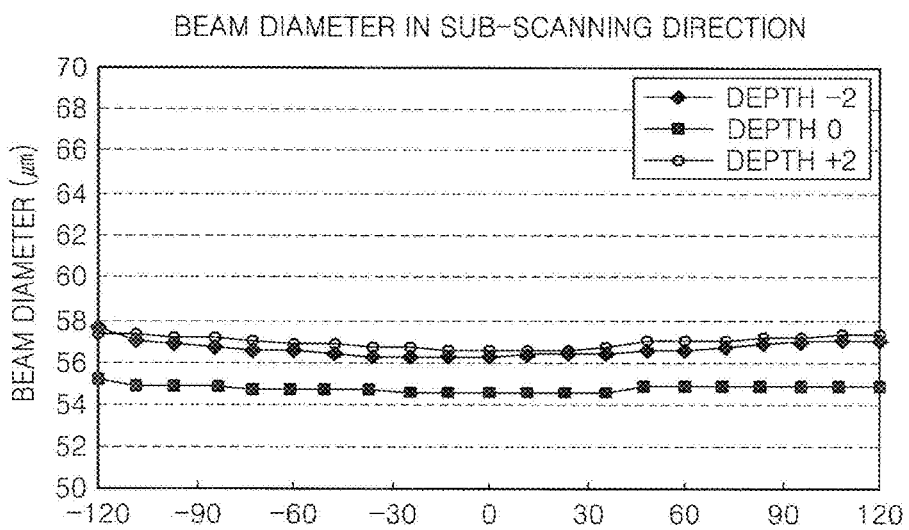

To evaluate the effects of the above embodiments, a simulation of the variation in beam diameter of light irradiated to a photosensitive body is performed for each of a first case in which the assembling datums are positioned at an end portion of the lens and a second case where the assembling datums are provided at a center portion of the lens, in each case the lens is assumed to be inclined at 3 degrees. The results of the simulation are shown in graphs of FIGS. 11A, 11B, 12A and 12B. As shown in FIGS. 11A and 11B, when the assembling datums are at the end portion of the lens, increases in the beam diameter are seen both in the main scanning direction (FIG. 11A) and the sub-scanning direction (FIG. 11B). The horizontal axis of the graphs refers to a position along the width of the photosensitive body, the point 0 along the horizontal axis representing the center position of the photosensitive body. On the other hand, as shown in FIGS. 12A and 12B, when the assembling datums are at the center portion of the lens, reductions in the beam diameter variation are observed both in the main scanning direction (FIG. 12A) and the sub-scanning direction (FIG. 12B), indicating an improved regularity in the focusing of the light. In FIGS. 11A, 11B, 12A and 12B, Depth 0 represents a point where a laser beam is focused, which is usually a surface of an organophotoconductor (OPC) drum, Depth +2 represents a point 2 mm past the focusing point of the laser beam, and Depth −2 represents a point 2 mm before the focusing point of the laser beam. Image height refers to a position coordinate value of an image on an OPC drum or a paper in a direction that a laser beam is scanned As described above, when the assembling datums in the sub-scanning direction are positioned between two end portions of a lens, variation in the light path may be reduced even when the position of the lens deviates, thus allowing mitigation of the degradation of the image quality attendant to the change of the light path.

While in the descriptions of various embodiments above, a cylindrical lens was used as an example of an optical element, it should be understood by one skilled in the art that the various aspects of the present disclosure described herein in reference to several embodiments may also be applied in the assembling of other optical elements, e.g., lenses, of a light scanner.

It should also be noted that, while the positional datums are shown in various figures herein as substantially flat leveled surfaces for illustrative purposes, the positional datums may be non-flat and/or inclined surfaces, in which case, the corresponding support surfaces that respectively come in contact with the positional datums have corresponding surface shapes and/or configurations.

While the present disclosure has been particularly shown and described with reference to several embodiments thereof, it will be understood by those of ordinary skill in the art that various changes in form and details may be made thereto without departing from the principles and spirit of the present disclosure, the proper scope of which is defined in the following claims and their equivalents.

What is claimed is:

1. A light scanner for scanning light along a main scanning direction across a photosensitive body, comprising:
    a source of light;
    a lens disposed on an optical path between the source of light and the photosensitive body; and
    a support body having a surface in supporting contact with the lens,
    wherein a positional datum of the lens for assembling the lens with the support body is located between two end portions of the lens and is disposed on a center line of the lens.

2. The light scanner of claim 1, wherein the positional datum is a first assembling datum for positioning the lens with respect to the support body in a sub-scanning direction, the sub-scanning direction being substantially perpendicular to the main scanning direction and corresponding to a direction of movement of the photosensitive body.

3. The light scanner of claim 2, wherein the lens comprises at least one of a second assembling datum for positioning the lens in the main scanning direction and a third assembling datum for positioning the lens in an optical axis direction.

4. The light scanner of claim 2, wherein the source of light comprises a first source of light and a second source of light, and
    wherein the positional datum is located between a first portion of the lens through which light from the first source of light passes and a second portion of the lens through which light from the second source of light passes.

5. The light scanner of claim 2, wherein the support body comprises a frame having a groove into which the positional datum is received, the groove having a surface in contact with the positional datum.

6. The light scanner of claim 2, wherein the support body comprises a holder having a groove into which the positional datum is received, the groove having a surface in contact with the positional datum, the holder being coupled to a frame of the light scanner.

7. The light scanner of claim 1, wherein the lens is a cylindrical lens.

8. An apparatus for scanning light from a light source along a main scanning direction across a photosensitive body, comprising:
    a lens disposed in an optical path between the light source and the photosensitive body, the lens having a contact surface located between two ends of the lens, a direction normal to the contact surface being not parallel to an optical axis of the lens; and
    a support body having a support surface opposingly facing, and in supporting contact with, the contact surface of the lens to maintain an inflection point of the lens when the contact surface is not parallel to the optical axis.

9. The apparatus of claim 8, wherein the contact surface of the lens extends from substantially about a center portion of the lens.

10. The apparatus of claim 8, wherein the contact surface is a first assembling datum for positioning the lens with respect to the support body in a sub-scanning direction, the sub-scanning direction being substantially perpendicular to both the main scanning direction and the optical axis of the lens.

11. The apparatus of claim 10, wherein the lens further comprises at least one of a second assembling datum for positioning the lens in the main scanning direction and a third assembling datum for positioning the lens in the optical axis direction.

12. The apparatus of claim 8, wherein the lens comprises a cylindrical lens.

13. The apparatus of claim 12, further comprising:
a light deflector arranged in the optical path and having a reflective surface moveably arranged so as to reflect light received from the light source along the main scanning direction,
wherein the cylindrical lens is positioned along the optical path between the light source and the light deflector.

14. The apparatus of claim 8, wherein the support body comprises a groove into which the lens is received, the supporting surface of the support body being formed in the groove.

15. An apparatus including a light scanner to scan light along a main scanning direction across a photosensitive body, comprising:

a lens disposed on an optical path between the light scanner and the photosensitive body, the lens comprising a contact surface disposed between respective end points of the lens; and
a support body comprising a support surface coupled to the contact surface of the lens to prevent an inflection point of the lens from moving with respect to the optical path or a sub-scanning direction upon rotation of the lens at the contact surface.

16. The apparatus of claim 15, wherein:
the lens further comprises at least one of a second contact surface disposed on the optical path and a third contact surface disposed in the main scanning direction; and
the support body further comprises at least one of a second support surface coupled to the second contact surface and a third support surface coupled to the third contact surface.

* * * * *